(12) United States Patent
Shin

(10) Patent No.: US 10,272,748 B2
(45) Date of Patent: Apr. 30, 2019

(54) VEHICLE HAVING MULTI-MODE DOOR

(71) Applicant: Faraday & Future Inc., Gardena, CA (US)

(72) Inventor: Changhyun Shin, Long Beach, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 15/644,561

(22) Filed: Jul. 7, 2017

(65) Prior Publication Data

US 2018/0154745 A1 Jun. 7, 2018

Related U.S. Application Data

(60) Provisional application No. 62/359,355, filed on Jul. 7, 2016.

(51) Int. Cl.
| | |
|---|---|
| *B60J 5/04* | (2006.01) |
| *E05D 15/52* | (2006.01) |
| *E05B 83/38* | (2014.01) |
| *B62D 25/06* | (2006.01) |
| *B62D 25/20* | (2006.01) |
| *B62D 25/04* | (2006.01) |

(52) U.S. Cl.
CPC ........... *B60J 5/0486* (2013.01); *B60J 5/0473* (2013.01); *B62D 25/04* (2013.01); *B62D 25/06* (2013.01); *B62D 25/2036* (2013.01); *E05B 83/38* (2013.01); *E05D 15/52* (2013.01); *E05Y 2900/531* (2013.01)

(58) Field of Classification Search
CPC ....... B60J 5/0486; B60J 5/0473; E05D 15/52; B62D 25/04; B62D 25/2036; B62D 25/06; E05B 83/38; E05Y 2900/531
USPC ......... 296/146.1, 146.11, 150, 146.5, 146.12
See application file for complete search history.

(56) References Cited

U.S. PATENT DOCUMENTS

| | | | | |
|---|---|---|---|---|
| 4,017,117 A | * | 4/1977 | Eggert, Jr. ............. | B60J 5/0473 296/146.6 |
| 4,378,658 A | * | 4/1983 | DeLorean ............. | E05F 1/1238 16/308 |
| 4,544,198 A | * | 10/1985 | Ochiai ................... | B60J 5/0479 296/155 |
| 5,992,918 A | * | 11/1999 | Gobart ................... | B60J 5/0473 296/146.1 |

(Continued)

*Primary Examiner* — Jason S Morrow
*Assistant Examiner* — E Turner Hicks
(74) *Attorney, Agent, or Firm* — Veros Legal Solutions, LLP

(57) ABSTRACT

A vehicle may have a rolling chassis with a plurality of tires, and a frame supported by the rolling chassis. The frame may include a floor, a roof, two A-posts, and two C-posts. The A- and C-posts may be connected to each other via the floor and the roof. The floor, roof, A-posts, and C-posts may together form a multi-row enclosure. Open spaces between the A- and C-posts may be unobstructed by additional posts. The vehicle may also include a door disposed within each of the open spaces between the A- and C-posts. The door may include a doorframe, a first hinge configured to pivotally connect the doorframe to the roof, a front-seat door panel, a second hinge configured to pivotally connect the front-seat door panel to the doorframe, a rear-seat door panel, and a third hinge configured to pivotally connect the rear-seat door panel to the doorframe.

12 Claims, 2 Drawing Sheets

(56) References Cited

U.S. PATENT DOCUMENTS

| | | | |
|---|---|---|---|
| 7,322,636 B1 * | 1/2008 | Woodhouse | B60J 5/0473 |
| | | | 296/146.1 |
| 7,533,600 B2 * | 5/2009 | Marqueling | F41H 5/16 |
| | | | 89/36.09 |
| 9,045,025 B1 * | 6/2015 | Greene | B60J 5/0473 |
| 9,573,546 B2 * | 2/2017 | Greene | F41H 5/226 |
| 2007/0126260 A1 * | 6/2007 | Geyrhofer | B60J 5/047 |
| | | | 296/146.12 |

* cited by examiner

US 10,272,748 B2

VEHICLE HAVING MULTI-MODE DOOR

CROSS-REFERENCE TO RELATED APPLICATIONS

This application claims the benefit of U.S. Provisional Application No. 62/359,355, filed Jul. 7, 2016, the entirety of which is hereby incorporated by reference.

TECHNICAL FIELD

The present disclosure relates generally to a vehicle and, more particularly, to a vehicle having a multi-mode door.

BACKGROUND

Conventional vehicles (e.g., passenger cars, trucks, vans, busses, etc.) have frames that provide enclosures for a driver and any number of passengers. The frames shield the driver and passengers from harsh environmental conditions, and provide support for connecting windows and doors to the vehicles.

A typical frame for a multi-row vehicle includes a front-seat opening and one or more rear-seat openings on each side of the vehicle. Each of the front- and rear-seat openings can be fitted with a pivoting door to close off the respective openings. Typical doors either pivot about a vertical axis (e.g., a conventional pivot axis) or about a horizontal axis (e.g., a gull-wing axis), and benefits may be associated with each type of pivoting door. For example, a conventionally pivoted door may be easier to close, particular by shorter individuals. However, a gull-wing pivoted door may require less clearance around the vehicle during door opening. In addition, a greater amount of overhead space at the opening may be provided by the gull-wing pivoted door, allowing for loading and/or unloading without stooping. Unfortunately, benefits of both types of conventional doors have not been simultaneously realized within the same vehicle.

The disclosed vehicle, door, and frame are directed to mitigating or overcoming one or more of the problems set forth above and/or other problems in the prior art.

SUMMARY

One aspect of the present disclosure is directed to a frame for a vehicle. The frame may include a floor and a roof. The frame may also include two A-posts positioned apart from each other at a leading end of the vehicle relative to a forward travel direction, and two C-posts positioned apart from each other at a trailing end of the vehicle opposite the two A-posts. The A-posts and the C-posts may be connected to each other via the floor and the roof. Open spaces between the A-posts and the C-posts may be unobstructed by additional posts.

Another aspect of the present disclosure is directed to a door for a vehicle. The door may include a doorframe, and a first hinge configured to pivotally connect the doorframe to the vehicle. The door may also include a front-seat door panel, and a second hinge configured to pivotally connect the front-seat door panel to the doorframe. The frame may further include a rear-seat door panel, and a third hinge configured to pivotally connect the rear-seat door panel to the doorframe.

Yet another aspect of the present disclosure is directed to a vehicle. The vehicle may include a rolling chassis having a plurality of tires, and a frame supported by the rolling chassis. The frame may include a floor, a roof, two A-posts spaced apart from each other at a leading end of the vehicle relative to a normal forward travel direction, and two C-posts spaced apart from each other at a trailing end of the vehicle opposite the two A-posts. The A-posts and the C-posts may be connected to each other via the floor and the roof. The floor, roof, A-posts, and C-posts may together form a multi-row enclosure. Open spaces between the A-posts and the C-posts may be unobstructed by additional posts. The vehicle may also include a door disposed within each of the open spaces between the A-posts and the C-posts. The door may include a doorframe, a first hinge configured to pivotally connect the doorframe to the roof, a front-seat door panel, a second hinge configured to pivotally connect the front-seat door panel to the doorframe, a rear-seat door panel, and a third hinge configured to pivotally connect the rear-seat door panel to the doorframe.

DETAILED DESCRIPTION

The disclosure is generally directed to a vehicle having a unique frame and door design. The design may allow an enclosure of the vehicle to be accessed via multiple modes, each having associated benefits. In addition, the design may allow for multiple rows of the enclosure to be accessed via a single opening and operation, which may increase an ease of access and an access opening size.

Figure 1:
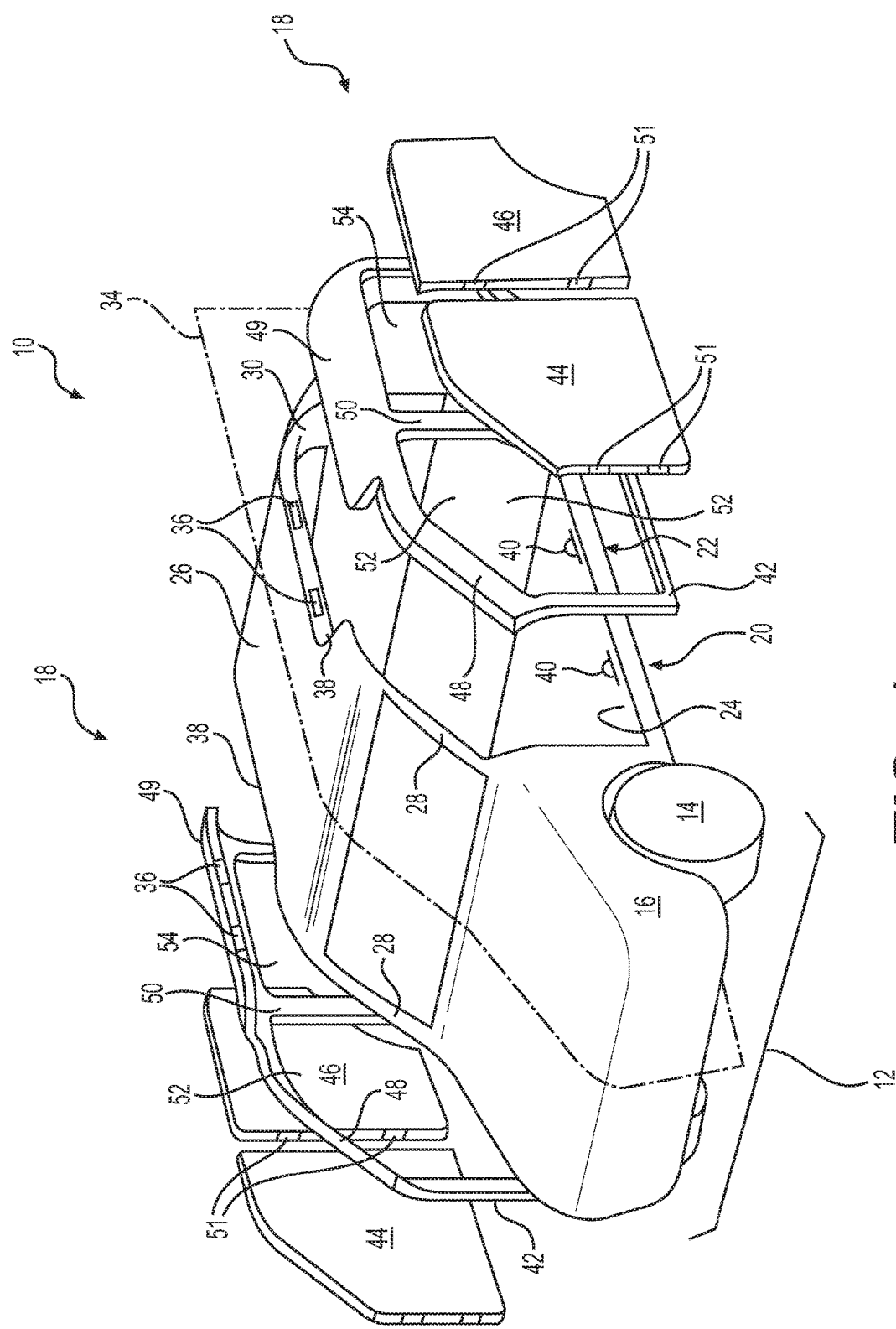
FIG. 1 is an exploded view illustration of an exemplary disclosed vehicle.

FIG. 1 is a perspective view illustration of an exemplary vehicle 10. Although vehicle 10 is shown as a sport utility vehicle in FIG. 1, it is contemplated that vehicle 10 may alternatively be a car, a van, or have another body style. Vehicle 10 may be an electric vehicle, a fuel-cell vehicle, a conventional combustion-powered vehicle, or a combination thereof. Vehicle 10, as is known in the art, may include a rolling chassis 12 having one or more tires 14, and a frame 16 supported by rolling chassis 12.

Frame 16 may provide an enclosure for a driver and any number of passengers, while supporting one or more doors 18. In the disclosed embodiment, vehicle 10 has a front or driver row 20, and a rear or passenger row 22. It is contemplated, however, that vehicle 10 could alternatively include multiple rear or passenger rows 22, if desired As will be described in more detail below, doors 18 may provide independent access to each of front and rear rows 20, 22 or simultaneous access to two or more of rows 20, 22. It is also contemplated that the seats within vehicle 10 may be arranged in configurations other than in rows. The seats may face forward or backwards, or rotatable to any desired orientations.

Frame 16 may include a floor 24, a roof 26, and plurality of posts that extend between floor 24 and roof 26. The posts may consist of a pair of spaced-apart A-posts 28 located at a leading end of the enclosure relative to a forward travel direction, and a pair of spaced-apart C-posts 30 (only one shown in FIG. 1) located at an opposing trailing end. In a conventional vehicle, the associated frame would normally also include a pair of spaced-apart B-posts located between any existing A- and C-posts. In the embodiment of FIG. 1, however, frame 16 does not include any B-posts. That is, the open space between A- and C-posts 28, 30 may be generally unobstructed by any other posts of frame 16. In one embodiment, each of A- and C-posts 28, 30 may be fabricated separately and then joined to floor 24 and roof 26 (e.g., by way of welding). In another embodiment, one or more of A- and C-posts 28, 30 may be integrally formed with floor 24 and/or roof 26 (e.g., via a stamping and/or bending process). Any number of gussets, webbing, or other support structures (not shown) may be used to enhance these connections, if desired. Although the disclosed frame 16 is shown as being generally symmetrical relative to a longitudinal plane 34 that is general aligned with a travel direction of vehicle 10 and orthogonal to a ground surface under vehicle 10, it is contemplated that frame 16 could be asymmetrical (e.g., have different one conventional side with a conventional B-post), if desired.

Frame 16 may further include hardware that facilitates mounting and/or securing of doors 18 (referring to FIG. 1). For example, one or more hinges 36 may be mounted to roof 26 (e.g., to a recess 38 formed within roof 26 at each lateral side) and configured to connect with door 18. In the disclosed embodiments, two spaced-apart hinges 36 are shown in association with each door 18. In this same embodiment, one or more latches (e.g., strikers of one or more latches) 40 may be mounted to frame 16 (e.g., to floor 24, between corresponding A- and C-posts 28, 30) to secure each door 18 in a closed position. It is contemplated, however, that hinge(s) 36 and/or latch(es) 40 could be mounted in another configuration. For example, latch 40 could be mounted to one or both of A- and C-posts 28, 30.

As shown in FIG. 1, each door 18 may be an assembly of components, including a doorframe 42, a front-seat door panel 44, and at least one rear-seat door panel 46. Doorframe 42 may be disposed within the open space between associated A- and C-posts 28, 30, and span the ends of front and rear rows 20, 22. Doorframe 42 may include an outer frame portion 48, and a B-post 50 that divides a space inside of frame portion 48 into a front-seat opening 52 and a rear-seat opening 54. Front-seat door panel 44 may be situated to close off the front-seat opening, while rear-seat door panel 46 may be situated to close off the rear-seat opening. It is contemplated that different shapes, designs, and numbers of door panels may be used based on the seat configuration inside vehicle 10.

Figure 2:
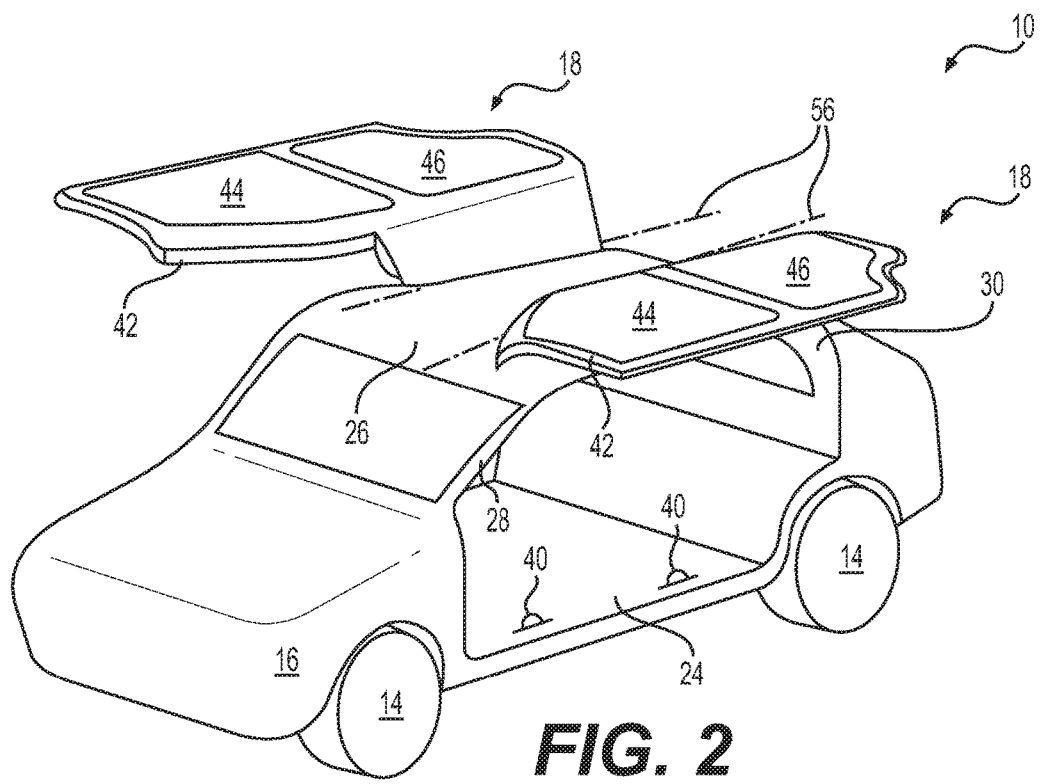
FIGS. 2 and 3 are perspective view illustrations of the vehicle of FIG. 1, showing two different modes of operation.
Figure 3:
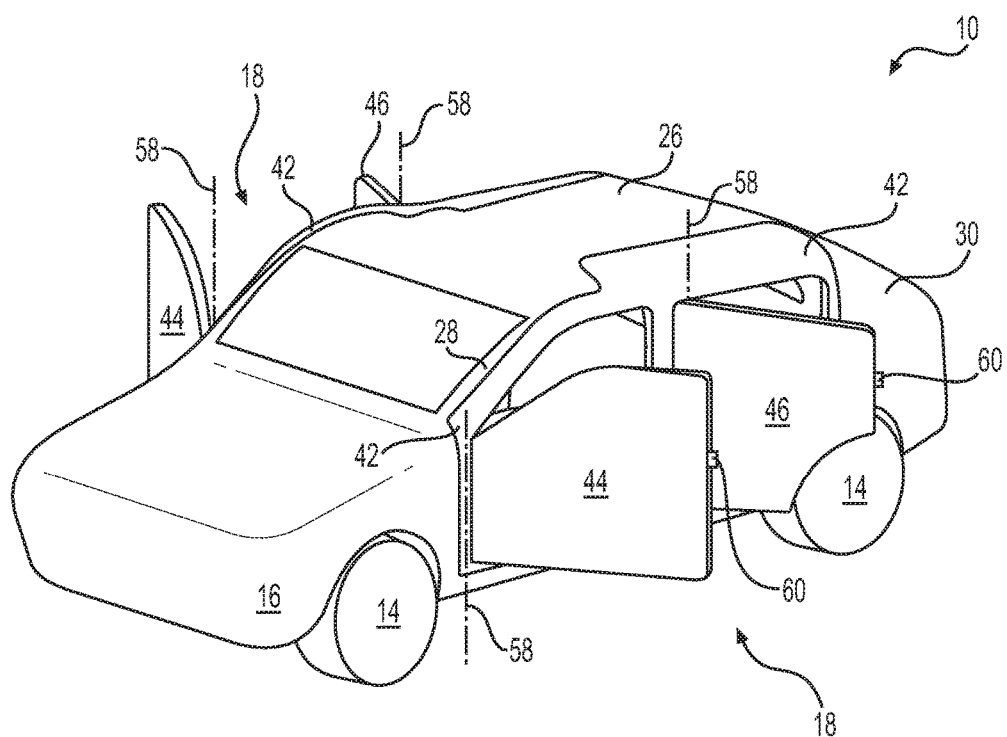

A portion of hinges 36, which are described above, may be mounted to doorframe 42 along an upper edge (e.g., on a protrusion 49 that extends inward from the upper edge), while each of front- and rear-seat door panels 44, 46, may connect to doorframe 42 via additional hinges 51 (e.g., two hinges for each door panel). As shown in FIG. 2, hinges 36 may allow doorframe 42 to pivot in a vertical direction (e.g., following a gull-wing trajectory) about a horizontal axis 56. As shown in FIG. 3, hinges 51 may allow front- and rear-seat door panels 44, 46 to pivot in a horizontal direction (e.g., following a conventional trajectory) about vertical axes 58. Doorframe 42 may be secured in a closed position by way of latches 40, while each of front- and rear-seat door panels 44, 46 may be secured in closed positions by way of corresponding latches 60.

A portion of hinges 51 and latches 60 may be mounted to doorframe 42. For example, the hinges 51 associated with front-door panel 44 may be mounted to a leading edge of frame portion 48, while the hinges 51 associated with rear-door panel 46 may be mounted to B-post 50. Likewise, the latch 60 associated with front-door panel 44 may be mounted to B-post 50, while the latch 60 associated with rear-door panel 46 may be mounted to a trailing edge of frame portion 48. Other configurations may also be possible. It is contemplated that one or more of doorframe 42, front-seat door panel 44, and/or rear-seat door panel 46 may be powered or only power-assisted, if desired. Doorframe 42 and rear-seat door panel 46 may include concentric recesses that provide clearance around a wheel well of vehicle 10 when door 18 is closed.

When doorframe 42 is closed, doorframe 42 may be configured to engage a side of vehicle 10 (e.g., to overlap a portion of floor 24, roof 26, A-post 28, and/or C-post 30). When front-seat door panel 44 is closed, front-seat door panel 44 may be configured to engage a side of doorframe 42 (e.g., to overlap B-post 50, as well as upper- and lower-sections of frame portion 48). When rear-seat door panel 46 is closed, rear-seat door panel 46 may also be configured to engage a side of doorframe 42 (e.g., to overlap upper-, lower-, and trailing-sections of frame portion 48). One or more seals (not shown) may be used in some or all of these engagements to weatherproof the enclosure of vehicle 10.

The configuration of door 18 may allow individuals to access the interior of vehicle 10 via various different modes. For example, in a first mode of operation, latch 40 may be released, allowing doorframe 42 to pivot upward about axis 56 (referring to FIG. 2). During this operation, front- and rear-seat door panels 44, 46 may remain closed with latches 60 engaged, such that doorframe 42, front-seat door panel 44, and rear-seat door panel 46 all move together as a single unit. In a second mode of operation, latches 60 may be independently released to allow separate horizontal pivoting of front- and rear-seat door panels 44, 46 about axes 58 (referring to FIG. 3). The direction of axes 58 may be substantially perpendicular to the direction of axis 56. Consistent with this application, two directions being substantially perpendicular refers to the intersection angle of the two axes being in a nominal range of 90 degrees. For example, two axes forming an intersection angle of 80 degrees to 100 degrees may be considered substantially perpendicular to each other. During this independent movement, latch 60 may not move, such that doorframe 42 remains stationary.

It will be apparent to those skilled in the art that various modifications and variations can be made to the disclosed vehicle, door, and frame. Other embodiments will be apparent to those skilled in the art from consideration of the specification and practice of the disclosed vehicle, door, and frame. It is intended that the specification and examples be considered as exemplary only, with a true scope being indicated by the following claims and their equivalents.

What is claimed is:

1. A door for a vehicle, including:
   a doorframe;
   a first hinge configured to pivotally connect the doorframe to the vehicle;
   a first door panel;
   a second hinge configured to pivotally connect the first door panel to the doorframe;
   a second door panel; and
   a third hinge configured to pivotally connect the second door panel to the doorframe.

2. The door of claim 1, wherein:
   the first hinge pivots about a first axis; and at least one of the second and third hinges pivots about another axis that is perpendicular to the first axis.

3. The door of claim 2, wherein:
   the first axis is horizontally oriented; and the another axis is vertically oriented.

4. The door of claim 1, wherein the doorframe includes a B-post disposed between the first and second door panels.

5. The door of claim 1, wherein:
the doorframe includes a protrusion at a pivot side; and
the door further includes at least one hinge mounted to the protrusion.

6. The door of claim 1, wherein the doorframe spans ends of a plurality of rows of the vehicle.

7. The door of claim 1, wherein the doorframe, the first door panel, and the second door panel move together during a first mode of operation.

8. The door of claim 7, wherein the first door panel and the second door panel move independently during a second mode of operation.

9. The door of claim 8, wherein the doorframe remains stationary during the second mode of operation.

10. The door of claim 1, further including:
a first latch configured to secure the doorframe to the vehicle;
a second latch configured to secure the first door panel to the doorframe; and
a third latch configured to secure the second door panel to the doorframe.

11. The door of claim 1, wherein the doorframe and the second door panel are both recessed to provide clearance around a wheel well of the vehicle.

12. A vehicle, including:
a rolling chassis having a plurality of tires;
a frame supported by the rolling chassis and including:
a floor;
a roof;
two A-posts positioned apart from each other at a leading end of the vehicle relative to a normal forward travel direction; and
two C-posts positioned apart from each other at a trailing end of the vehicle opposite the two A-posts,
wherein:
the A-posts and the C-posts are connected via the floor and the roof; and
open spaces between the A-posts and the C-posts are unobstructed by additional posts; and
a door disposed within each of the open spaces between the A-posts and the C-posts, the door including:
a doorframe;
a first hinge configured to pivotally connect the doorframe to the roof;
a first door panel;
a second hinge configured to pivotally connect the first door panel to the doorframe;
a second door panel; and
a third hinge configured to pivotally connect the second door panel to the doorframe.

* * * * *